(12) United States Patent
Webb et al.

(10) Patent No.: US 9,174,537 B1
(45) Date of Patent: Nov. 3, 2015

(54) FIBER COMPOSITE SUPPORT FOR VEHICULAR COMPONENTS

(71) Applicant: Ford Global Technologies, LLC, Dearborn, MI (US)

(72) Inventors: Jeff Webb, Iron Mountain, MI (US); Kalyanaraman Bharathan, Canton, MI (US); Tim Beard, Perry, MI (US); Bernard Gerard Marchetti, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 14/301,471

(22) Filed: Jun. 11, 2014

Related U.S. Application Data

(63) Continuation-in-part of application No. 14/270,951, filed on May 6, 2014.

(51) Int. Cl.
*B60K 37/00* (2006.01)

(52) U.S. Cl.
CPC ............. *B60K 37/00* (2013.01); *B60K 2350/40* (2013.01)

(58) Field of Classification Search
CPC ...... B60K 37/00; B62D 25/14; B29C 43/003; B29C 43/02; B29C 47/0004
USPC ............................................... 180/90; 296/70
See application file for complete search history.

(56) References Cited

U.S. PATENT DOCUMENTS

| | | | |
|---|---|---|---|
| 4,884,778 A | 12/1989 | Yamamoto | |
| 5,088,571 A | 2/1992 | Burry et al. | |
| 5,364,159 A | 11/1994 | Kelman et al. | |
| 5,979,860 A | 11/1999 | Jurik et al. | |
| 6,022,550 A * | 2/2000 | Watanabe | 424/402 |
| 6,497,432 B2 | 12/2002 | Scheib et al. | |
| 6,517,145 B2 | 2/2003 | Hedderly | |
| 6,692,026 B2 | 2/2004 | Gianaris et al. | |
| 6,802,559 B2 | 10/2004 | Yoshihara et al. | |
| 6,952,979 B2 | 10/2005 | Cartwright et al. | |
| 7,303,714 B2 | 12/2007 | Matsuzaki et al. | |
| 7,632,445 B2 | 12/2009 | Porter et al. | |
| 8,449,013 B2 | 5/2013 | Carter | |
| 2002/0135161 A1* | 9/2002 | Lamb et al. | 280/728.3 |
| 2006/0051569 A1 | 3/2006 | Porter et al. | |
| 2006/0081612 A1* | 4/2006 | Kuntz | 219/544 |

(Continued)

FOREIGN PATENT DOCUMENTS

| | | |
|---|---|---|
| DE | 3806783 A1 | 9/1989 |
| DE | 102008021103 A1 | 10/2009 |

(Continued)

*Primary Examiner* — James English
(74) *Attorney, Agent, or Firm* — Vichit Chea; Price Heneveld LLP

(57) ABSTRACT

A vehicular instrument panel having a reinforcement that includes a plurality of chopped carbon fibers within a nylon resin, a substrate coupled to the reinforcement comprising a plurality of chopped carbon and chopped glass fibers within a nylon resin, and a steering column bracket defined from the substrate comprising a plurality of chopped carbon fibers within a nylon resin. The bracket engages a steering column such that the substrate and bracket support the steering column. The plurality of chopped carbon and glass fibers in the substrate can be segregated such that the carbon fibers and the glass fibers are each substantially concentrated within respective driver-side and passenger-side portions of the substrate.

20 Claims, 8 Drawing Sheets

(56) References Cited

U.S. PATENT DOCUMENTS

| | | | |
|---|---|---|---|
| 2006/0097539 A1* | 5/2006 | Noisternig et al. | 296/70 |
| 2008/0057285 A1* | 3/2008 | Polk | 428/299.1 |
| 2008/0098655 A1 | 5/2008 | Valentage | |
| 2008/0315612 A1 | 12/2008 | D'Alessandro | |
| 2009/0309260 A1* | 12/2009 | Keuchel | 264/258 |
| 2011/0233955 A1* | 9/2011 | Utsugi et al. | 296/70 |
| 2013/0052412 A1* | 2/2013 | Fox et al. | 428/139 |
| 2013/0249242 A1* | 9/2013 | Kimoto et al. | 296/181.2 |
| 2013/0257120 A1* | 10/2013 | Tracht et al. | 297/216.13 |
| 2014/0178652 A1* | 6/2014 | Gross et al. | 428/189 |
| 2015/0115580 A1* | 4/2015 | Gould et al. | 280/730.1 |

FOREIGN PATENT DOCUMENTS

| | | |
|---|---|---|
| EP | 0083701 A2 | 7/1983 |
| WO | 0170558 A1 | 9/2001 |
| WO | 2013072021 A1 | 5/2013 |

* cited by examiner

FIBER COMPOSITE SUPPORT FOR VEHICULAR COMPONENTS

CLAIM OF PRIORITY

The present application is a continuation-in-part application that claims priority to and the benefit under 35 U.S.C. §120 of U.S. patent application Ser. No. 14/270,951 filed on May 6, 2014, now pending, entitled "HYBRID COMPOSITE INSTRUMENT PANEL," the entire disclosure of which is hereby incorporated herein by reference.

FIELD OF THE INVENTION

The present disclosure generally relates to composite component designs, and more particularly relates to composite vehicular instrument panel designs and methods for making the same.

BACKGROUND OF THE INVENTION

It is becoming more common for vehicles to utilize lightweight components and designs in order to decrease vehicle weight, particularly in large, interior vehicle components such as instrument panels. Weight reductions can increase vehicle performance and fuel economy. Weight savings may be realized by substituting current materials of vehicle components with lighter weight materials. However in some cases, lighter weight materials employed in vehicles can have less mechanical integrity than their heavier weight counterparts.

In other cases, certain lighter weight materials, such as carbon fiber composites, can actually have improved mechanical performance over conventional materials. Unfortunately, the manufacturing costs of making vehicular components with these materials can be prohibitive or at least not low enough to offset the potential improvements in vehicle performance and fuel economy. Further, these stronger composite materials are often employed in large vehicular components that have only one or a handful of regions that actually require elevated mechanical performance.

Accordingly, there is a need for lighter-weight vehicular components having better or comparable mechanical performance when compared to conventional vehicular components. There is also a need to tailor the mechanical properties in particular regions within these components for the particular application, thus minimizing the use of expensive reinforcing materials and maximizing mechanical property enhancements where it is required in the component.

SUMMARY OF THE INVENTION

According to one aspect of the present disclosure, a vehicular instrument panel includes a reinforcement comprising a plurality of chopped carbon fibers within a nylon resin and a substrate coupled to the reinforcement. The substrate includes a plurality of chopped carbon and chopped glass fibers within a nylon resin. The panel further includes a steering column bracket that is defined from the substrate and comprises a plurality of chopped carbon fibers within a nylon resin. The steering column bracket engages a steering column such that the substrate and bracket support the steering column.

According to another aspect of the present disclosure, a vehicular instrument panel includes a reinforcement comprising a plurality of chopped carbon fibers within a nylon resin and a substrate coupled to the reinforcement. The substrate comprises a plurality of chopped carbon and chopped glass fibers within a nylon resin. The panel further includes a mounting bracket element that is defined from the substrate, and a support bracket element that is coupled to the mounting bracket. The mounting bracket comprises a plurality of chopped carbon fibers within a nylon resin.

According to a further aspect of the present disclosure, a vehicular instrument panel includes a reinforcement comprising a first fiber material within a resin and a substrate comprising the first fiber material and a second fiber material within a second resin. The first and second fiber materials are substantially segregated into respective driver-side and passenger-side portions of the substrate. The panel includes a mounting bracket that is defined from the driver-side portion of the substrate. The mounting bracket comprises the first fiber material within the second resin.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
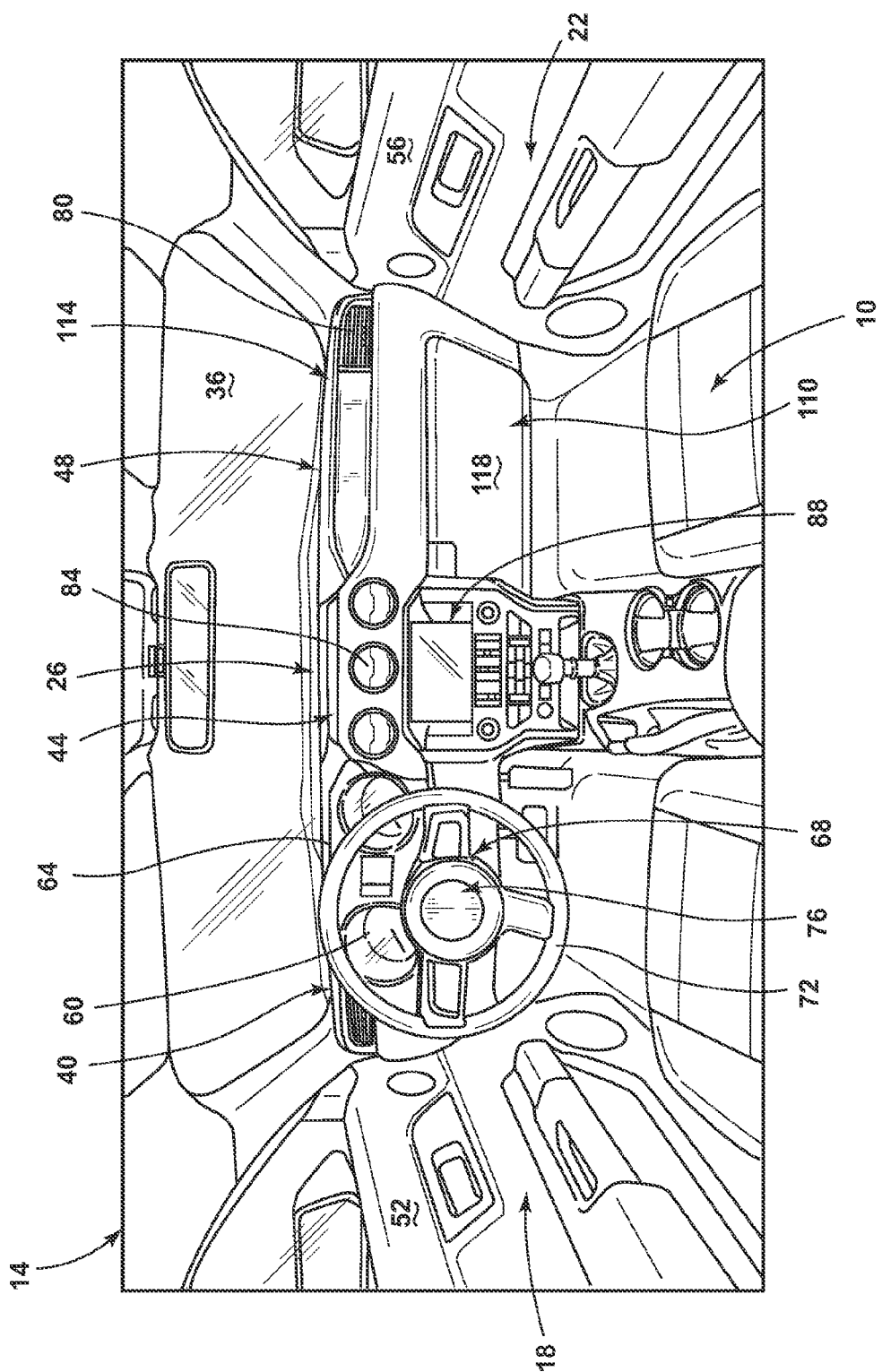
FIG. 1 is a front perspective view of a vehicular instrument panel within a vehicle according to one embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a cabin 10 of a vehicle 14 is depicted. The vehicle 14 includes a driver-side region 18 and a passenger-side region 22. Inside the cabin 10 is an instrument panel 26, among other vehicle components, such as a windshield 36. The instrument panel 26 is located vehicle forward in the cabin 10 beneath the windshield 36. The instrument panel 26 has a driver-side portion 40, a center-stack portion 44, and a passenger-side portion 48. These portions of the instrument panel 26, and particular regions or locations within them, often have differing mechanical property requirements.

As used in this disclosure, "outboard" refers to the lateral sides or regions most proximate to a driver-side door 52 and a passenger-side door 56 in the vehicle 14. The term "inboard" as used in this disclosure refers to a central area in the vehicle 14 inboard from the laterally opposing outboard sides or regions.

The driver-side and passenger-side portions 40, 48 of the instrument panel 26 are in substantial proximity to respective driver-side and passenger-side regions 18, 22 of the vehicle 14. The driver-side portion 40 of the instrument panel 26 includes an instrument cluster 60 covered by an instrument cluster hood 64. Located below the instrument cluster 60 is a steering column 68. The steering column 68 is supported by the instrument panel 26 and engages a steering system (not shown) vehicle forward of the instrument panel 26. The steering column 68 extends from the steering system into the cabin 10 through the instrument panel 26. The steering column 68 has a steering wheel 72 disposed in the cabin 10 in the driver-side region 18 of the vehicle 14. The steering wheel 72 includes a driver airbag 76 which deploys upon a vehicle collision event. As such, the driver-side portion 40 of the instrument panel 26 can have demanding mechanical requirements, particularly at locations where it must support other vehicular components subject to variable loads and motion, e.g., steering column 68.

Still referring to FIG. 1, disposed on each outboard side of the instrument panel 26 is a side air vent 80. The instrument panel 26 also incorporates a set of central air vents 84 located in the center-stack portion 44 of the instrument panel 26. The center-stack portion 44 of the instrument panel 26 is located between the driver-side portion 40 and the passenger-side portion 48. The center-stack portion 44 includes an interface 88 that is operable by occupants of both the driver-side and the passenger-side regions 18, 22 of the vehicle 14. The center-stack portion 44 is connected to both the driver-side portion 40 and the passenger-side portion 48 of the instrument panel 26.

As also depicted in FIG. 1, the passenger-side portion 48 of the instrument panel 26 includes a glove box assembly 110, and a passenger airbag assembly 114 that is located above the assembly 110. The glove box assembly 110 includes a glove box door 118 permitting access to a glove box bin (not shown). In some embodiments, the glove box assembly 110 is a separate component from the instrument panel 26 and is inserted and attached during manufacturing. In other embodiments, the glove box bin of the assembly 110 is integrally formed from an instrument panel substrate 120 (FIG. 2) of the instrument panel 26 and the glove box door 118 is a separate component that is attached during manufacturing. Depending on the configuration of passenger side portion 48, it may have central regions or locations that require additional mechanical reinforcement, such as where it contains or attaches to glove box assembly 110.

Referring again to FIG. 1, the passenger airbag assembly 114 includes a passenger airbag chute 124 (FIG. 2), and other components such as a passenger airbag, an airbag canister, and an inflator. During a vehicle collision event, the passenger airbag is inflated by the inflator (not shown), thereby causing the passenger airbag to expand from the canister through the passenger airbag chute 124 (FIG. 2) and out of the instrument panel 26. The inflation and expansion of the airbag generates high stresses in surrounding components which can lead to structural failure of the instrument panel 26 if not properly reinforced. In some embodiments, the instrument panel substrate 120 (FIG. 2) of the instrument panel 26 may also include knee airbag canisters for the occupants of both the driver-side and passenger-side regions 18, 22, potentially necessitating additional reinforcement.

Figure 2:
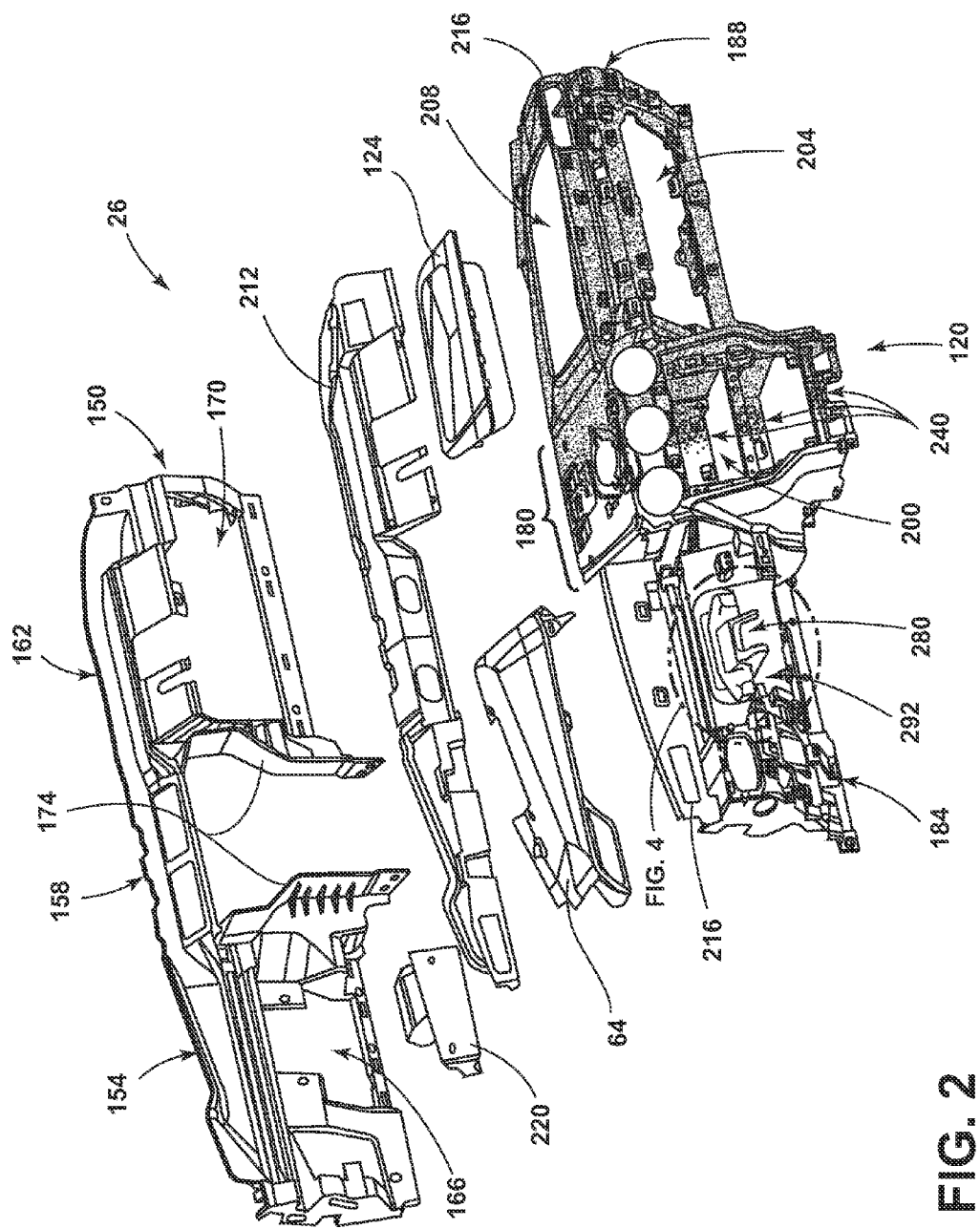
FIG. 2 is an exploded top perspective view of the instrument panel depicted in FIG. 1.

Referring now to FIG. 2, the instrument panel 26 includes the instrument panel substrate 120 and a reinforcement 150. The reinforcement 150 is located vehicle forward of the substrate 120 and is coupled to the substrate 120 at multiple points. The substrate 120 and the reinforcement 150 may be coupled via adhesive bonding, vibration welding, hot plate welding, or other forms of joining. The reinforcement 150 includes a driver-side portion 154, a center-stack portion 158, and a passenger-side portion 162. The reinforcement 150 defines a steering column aperture 166 and a glove box aperture 170 on the respective driver-side and passenger-side portions 154, 162. Flanges 174 are located within the center-stack portion 158 of the reinforcement 150 and extend vehicle rearward to engage and couple with a center-stack portion 180 of the substrate 120.

As also depicted in FIG. 2, the instrument panel substrate 120 includes a driver-side portion 184, the center-stack portion 180, and a passenger-side portion 188. The driver-side portion 184 of the substrate 120 defines a steering column opening 192 which aligns with the steering column aperture 166 of the reinforcement 150 when the substrate 120 and the reinforcement 150 are coupled. The steering column 68 (FIG. 1) passes through both the steering column aperture 166 and the steering column opening 192, and is attached to the substrate 120 via a steering column mounting area 196, as shown in FIG. 2. The steering column mounting area 196 is located on the substrate 120 proximate to the steering column opening 192. In some embodiments, a jacket for the steering column 68 may be integrally formed in the substrate 120 proximate to the mounting area 196. In other embodiments, a mounting bracket or a support bracket may be integrally formed in the substrate 120 proximate to the steering column opening 192 for supporting the steering column 68. The coupling of the reinforcement 150 to the substrate 120 provides sufficient strength for the mounting area 196, and ultimately the instrument panel 26, to support the weight of the steering column 68 without the use of a cross-car beam. As such, certain regions or locations in the driver-side portion 184 of the substrate 120 may require and/or benefit from additional reinforcement.

Still referring to FIG. 2, the center-stack portion 180 of the instrument panel substrate 120 includes an electronics bay 200 for housing and mounting the interface 88 (FIG. 1) as well as other electronic components. The center-stack portion 180 is located between and is integrally connected to both the driver-side and passenger-side portions 184, 188 of the substrate 120. Depending on the electronic components and other components deployed in the center-stack portion 180, additional localized reinforcement in the substrate 120 with hybrid composites in these regions could provide mechanical performance and/or weight savings benefits.

The passenger-side portion 188 of the instrument panel substrate 120 defines a glove box opening 204 and a passenger airbag assembly opening 208 for housing the respective glove box assembly 110 (FIG. 1) and passenger airbag assembly 114 (FIG. 1). In some embodiments, the substrate 120 may be configured to further define a glove box bin and/or an airbag canister as integral bodies that extend from the respective glove box and passenger airbag assembly openings 204, 208. In other embodiments, the reinforcement 150 could be configured to define a glove box bin and/or an airbag canister.

The substrate 120 and the reinforcement 150 can also be configured to define knee airbag canisters.

As also depicted in FIG. 2, a duct 212 is located between the instrument panel substrate 120 and the reinforcement 150. The duct 212 conveys air when bonded to the reinforcement 150. The air travels though the duct 212 to a set of substrate vent openings 216 which direct the air to the side and central air vents 80, 84 of the instrument panel 26 (FIG. 1). Attached to the reinforcement 150 is a plenum bracket 220 which connects with a firewall (not shown) of the vehicle 14. The plenum bracket 220 prevents bending of the instrument panel 26 in a vehicle forward and rearward direction. The plenum bracket 220 can also provide additional support for the steering column 68 (FIG. 1), coupled to the substrate 120.

Referring again to FIG. 2, the instrument panel substrate 120 is formed from a hybrid composite material according to an embodiment of this disclosure. In one exemplary embodiment, the driver-side portion 184 can be formed from a nylon resin having chopped carbon fibers disposed in the resin. The passenger-side portion 188 can be formed from a nylon resin having chopped glass fibers disposed in the resin. In general, regions in the substrate 120 with higher percentages of chopped carbon fibers can have enhanced mechanical properties (e.g., toughness, tensile strength, fatigue resistance). The carbon fiber volume fraction and the glass fiber volume fraction in the passenger-side and driver-side portions 184, 188 may be between about 1% and about 60%, preferably between about 15% and about 40%, and more preferably between about 30% to about 40%. In some embodiments, the fiber volume fraction in the driver-side portion 184 may be different from the fiber volume fraction in the passenger-side portion 188 of the substrate 120. In additional embodiments, areas of the substrate 120 that are anticipated to encounter high stresses are configured to incorporate higher fiber volume fractions of chopped carbon fibers than areas not expected to experience high stresses. For example, the mounting area 196 may incorporate a higher fiber volume fraction, particularly of chopped carbon fibers, than the rest of the driver-side portion 184 of the substrate 120 to aid in supporting the steering column 68. In another example, the surfaces of the instrument panel substrate 120 and reinforcement 150 subject to high stress during airbag deployment may incorporate higher fiber volume fractions. In further embodiments, the driver-side and passenger-side portions 184, 188 of the substrate 120 may incorporate more than two composite materials.

In some embodiments, the fibers employed in the driver-side and passenger-side portions 184, 188 of the instrument panel substrate 120 can be composed of materials including carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. Driver-side and passenger-side portions 184, 188 may also incorporate more than one type of fiber. In some embodiments, the length of the chopped fibers can be between about 3 mm and about 11 mm, and more preferably between about 5 mm and about 7 mm. Typically, the fibers are randomly oriented in the resins within the driver-side and passenger-side portions 184, 188. However, they may also be substantially aligned directionally in areas of the substrate 120 subject to high directional stresses. Further, the resins employed in the driver-side and passenger-side portions 184, 188 can comprise a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof. In some embodiments, the resin of the driver-side portion 184 may be different from the resin employed in the passenger-side portion 188 of the substrate 120. It should also be understood that the reinforcement 150 and its driver-side, center-stack and passenger-side portions 154, 158, 162 can be fabricated with hybrid composite materials comparable to those described above in connection with substrate 120. For example, the driver-side portion 154 of the reinforcement 150 can be formed from a nylon resin having chopped carbon fibers disposed in the resin. The passenger-side portion 162 can be formed from a nylon resin having chopped glass fibers disposed in the resin. Further, the volume fraction of the fibers in the resins, preferably the chopped carbon fibers, may be greater in areas subject to higher stress levels than in the rest of the reinforcement 150.

Still referring to FIG. 2, the chopped carbon and glass fibers are segregated in the substrate 120 of the instrument panel 26 such that the carbon fibers are substantially concentrated in the driver-side portion 184 of the substrate 120 and the glass fibers are substantially concentrated in the passenger-side portion 188 of the substrate 120. In general, the center-stack portion 180 of the substrate 120 is composed of both chopped carbon and glass fibers. In some embodiments, the center-stack portion 180 may primarily include carbon fibers, or primarily glass fibers. In other embodiments, the carbon fibers primarily contained in the driver-side portion 184 may also partially occupy the passenger-side portion 188 of the substrate 120. In further embodiments, the carbon fibers primarily in the driver-side portion 184 may also occupy portions of the substrate 120 which are subject to high stress, regardless of passenger-side or driver-side orientation. For example, airbag deployment surfaces located in or on the substrate 120 or reinforcement 150 can include higher percentages of carbon fibers for additional mechanical reinforcement. The segregation of the fibers, e.g., chopped carbon and glass fibers, in the substrate 120 allows the higher strength fiber, e.g., carbon fiber, to be selectively used where there are particular high strength needs for the substrate 120, such as to support the steering column 68. The selective use of high percentages of carbon fibers based on driver/passenger orientation relative to the vehicle 14 allows a cost savings by efficiently using the more expensive carbon fibers only where needed.

As also shown in FIG. 2, a boundary region 240 can exist in some embodiments at the interface between the driver-side and passenger-side portions 184, 188 of the instrument panel substrate 120. The boundary region 240 includes a mixture of both types of fibers and resin(s) employed in the driver-side and passenger-side portions 184, 188 of the substrate 120. The mixing of fibers within the boundary region 240 ensures that an integral connection exists between portions of the substrate 120 composed of different composite materials. In one embodiment, the boundary region 240 may span or otherwise encompass the entire center-stack portion 180 of the substrate 120. In another embodiment, the boundary region 240 may be present only between the center-stack and passenger-side portions 180, 188, or between the driver-side and center-stack portions 184, 180 of the substrate 120. The boundary region 240 can also be located anywhere in the substrate 120 where there is an interface between portions of the substrate 120 containing differing fiber fractions, fiber types and/or resins. In one exemplary embodiment, driver-side portion 184 may have an approximate 30% to 40% volume fraction of chopped carbon fibers in a resin, the passenger-side portion 188 may have an approximate 30% to 40% volume fraction of chopped glass fibers in the resin, and the center-stack portion 180 or the boundary region 240 may have an approximate 15% to 20% volume fraction of chopped carbon fibers and an approximate 15% to 20% volume fraction of chopped glass fibers in the resin. In this configuration, the driver-side portion 184 is particularly reinforced with higher percentages of chopped carbon fibers relative to other portions of the substrate 120.

According to some embodiments, the instrument substrate 120 and/or the reinforcement 150 of the instrument panel 26 may incorporate one or more preformed fiber mats in addition to the portions containing chopped fibers in a resin or resins. The preformed fiber mats may include woven or non-woven fibers that are held together using the same or different resins as employed in the driver-side and passenger-side portions 184, 188 of the substrate 120. The mats may also incorporate fibers having different dimensions from the fibers employed in the driver-side and passenger-side portions 184, 188 of the substrate 120. Similarly, the fibers of the mats may be in either a continuous or chopped configuration. The fibers of the mats may also be composed of a material having the same or a different composition from that of the fibers employed in the driver-side and passenger-side portions 184, 188 of the substrate 120. The mats may be incorporated in areas of the substrate 120 and/or the reinforcement 150 having high or low fiber volume fractions. Multiple mats may be used and layered in varying orientations in order to further enhance the mechanical properties of the substrate 120 and/or reinforcement 150 at particular locations. Exemplary locations in the substrate 120 for placement of the mat include, but are not limited to: the steering column mounting area 196, airbag assembly opening 208, glove box opening 204, coupling locations between the reinforcement 150 and the substrate 120, and other locations anticipated to experience higher stress levels compared to stresses in other areas of the substrate 120.

The utilization of a hybrid composite containing fibers (e.g., chopped carbon and glass fibers in a nylon resin) in the substrate 120 and the reinforcement 150 as part of instrument panel 26 permits the vehicle 14 to be designed and manufactured without a cross-car beam. Conventional cross-car beams are thick metal components traditionally used to support the instrument panel 26 and the steering column 68 of the vehicle 14. In addition to adding significant weight to the vehicle 14, the cross-car beam occupies a potential storage space behind the instrument panel 26 and obstructs placement of the passenger airbag assembly 114 and the glove box assembly 110. Without the cross-car beam, the vehicle 14 can achieve greater fuel efficiency as well as enhanced design freedom for the instrument panel 26 and its subassemblies.

Figure 3:
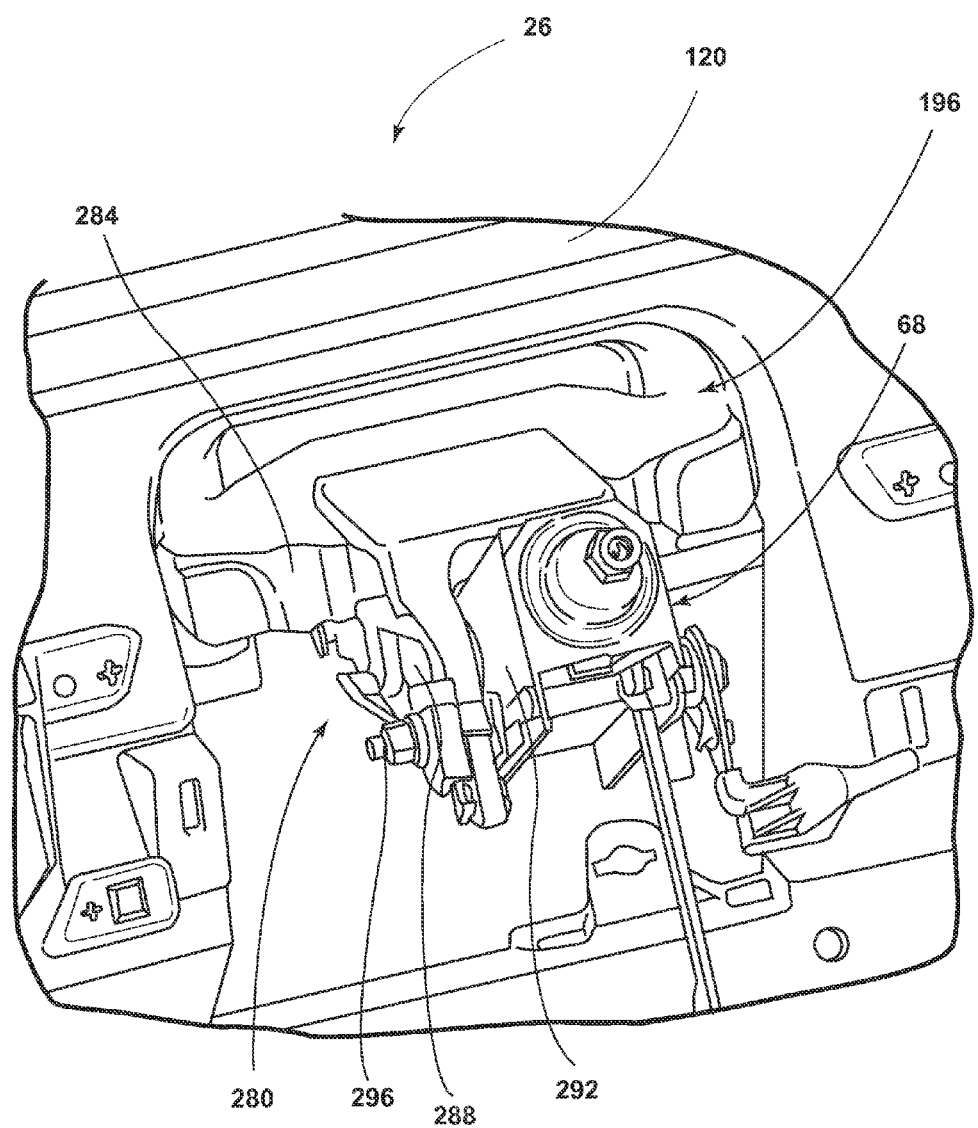
FIG. 3 is a front perspective view of an instrument panel substrate according to another embodiment.

Referring now to FIG. 3, the substrate 120 of the instrument panel 26 defines integral mounting attachments for the support of the steering column 68 according to an embodiment of this disclosure. These mounting attachments are configured in the sense that they can be formed directly from the substrate 120 without additional parts by virtue of the hybrid composites disclosed herein. In one exemplary embodiment, a mounting bracket element 284 is integrally formed from the mounting area 196 of the driver-side portion 184 (see FIG. 2) of the substrate 120. The mounting bracket element 284 shown in FIG. 3 extends vehicle forward and protrudes through the steering column aperture 166 of the reinforcement 150 when the substrate 120 and the reinforcement 150 are coupled together (see FIG. 2). The mounting bracket element 284 extends vehicle forward to engage the plenum bracket 220 (see FIG. 2). As further depicted in FIG. 3, the coupling of the mounting bracket element 284 with the plenum bracket 220 increases the stability of the steering column 68 and allows distribution of the weight of the steering column 68 between the instrument panel 26 and the firewall of the vehicle 14.

In other embodiments of the instrument panel 26, the mounting bracket element 284 can be coupled to the reinforcement 150 (see FIG. 2) or directly to the firewall to provide additional support. In another embodiment, the mounting bracket element 284 only connects to the substrate 120 such that only the substrate 120 and the reinforcement 150 carry the load of the steering column 68. It should be understood that the mounting bracket element 284 may instead be integrally defined by, or otherwise formed from, the reinforcement 150 rather than the substrate 120. Further, the mounting bracket element 284 may be divided between the substrate 120 and reinforcement 150 such that the coupling of the substrate 120 and the reinforcement 150 forms the mounting bracket element 284. The integration of the mounting bracket element 284 into the substrate 120 provides greater design flexibility and decreases the part count of the instrument panel 26, thus decreasing manufacturing expense and weight of the vehicle 14.

The mounting bracket element 284, as depicted in FIG. 3, also extends vehicle rearward from the substrate 120 and engages a support bracket element 288. The mounting bracket element 284 can engage the support bracket element 288 in a variety of ways including, but not limited to, a rail system, interlocking mechanical connections, and fasteners. Typically, the support bracket 288 element is a metallic component which extends vehicle rearward from the mounting bracket element 284 and engages a steering column jacket 292 of the steering column 68. The support bracket element 288 is depicted as engaging the steering column jacket 292 through a mechanical fastener 296, but may engage the steering column jacket 292 in a variety of ways. The support bracket element 288 engages the steering column jacket 292 such that the weight of the steering column 68 is transferred to the substrate 120 and/or reinforcement 150 through the integral connection of the mounting bracket element 284.

Figure 4:
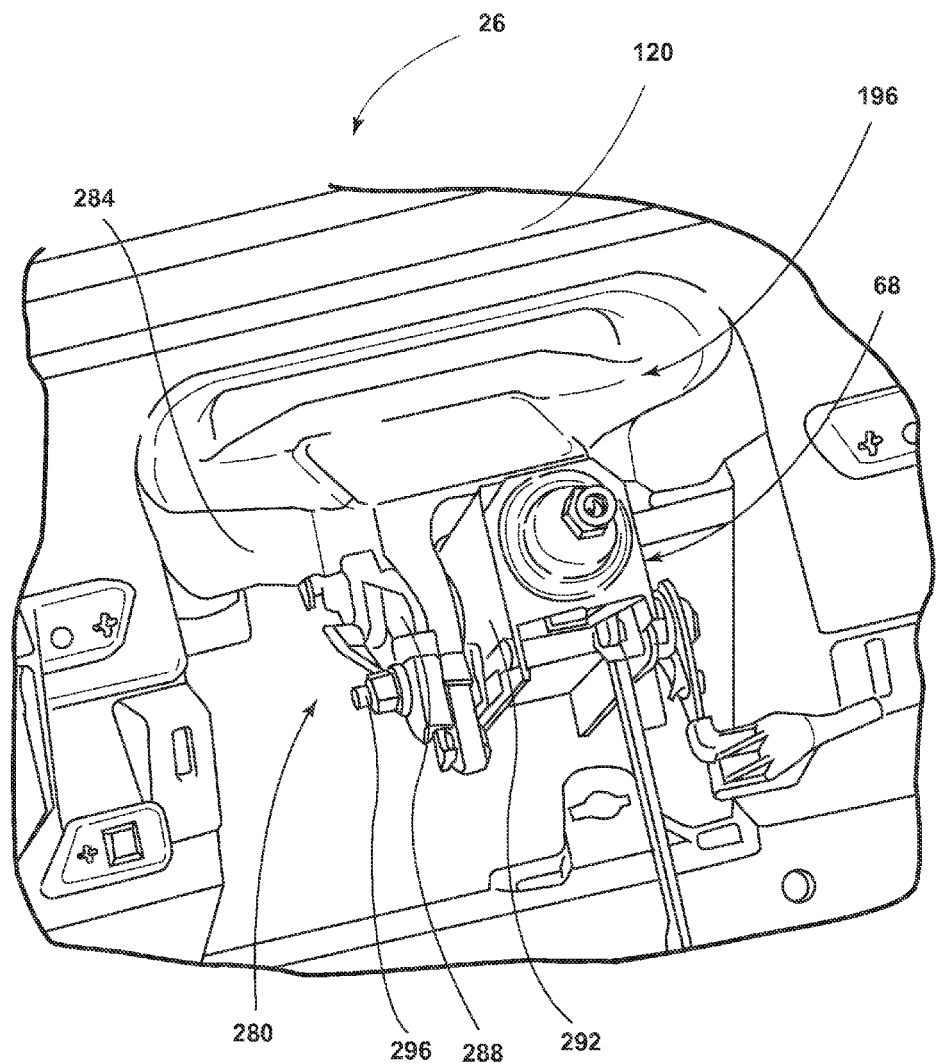
FIG. 4 is a front perspective view of an instrument panel substrate according to a further embodiment.

As depicted in FIG. 4, the instrument panel 26 may also incorporate a substrate 120 with a steering column bracket 280 to engage the steering column jacket 292 of the steering column 68 according to another embodiment of this disclosure. The steering column bracket 280 can be formed into the substrate 120 as a unitary support component that performs the functions of the support bracket element 288 and the mounting bracket element 284 depicted in connection with the embodiment shown in FIG. 3. The steering column bracket 280 is integrally formed with the substrate 120 and extends outwardly from the mounting area 196 of the substrate 120 to engage the steering column jacket 292 of the steering column 68. The steering column bracket 280 can be attached to the steering column jacket 292 by the mechanical fastener 296, or through other methods of joining. The integration of the support bracket element 288 into the substrate 120 (FIG. 3) to form the steering column bracket 280 (FIG. 4) further reduces the part count, and increases the design flexibility, of the instrument panel 26.

In some embodiments of the instrument panel 26, the steering column jacket 292 may also be integrated into the substrate 120. The steering column jacket 292 can be integrally formed from the steering column bracket 280 or may be integrally defined in the mounting area 196 of the substrate 120. These embodiments also can advantageously reduce the part count of the instrument panel 26.

Referring again to FIGS. 3-4, the mounting bracket element 284 and the steering column bracket 280 of the instrument panel 26 are formed of a fiber and resin composite according to an embodiment of this disclosure. In some embodiments, the mounting bracket element 284 and the steering column bracket element 280 can be formed of the same fiber and resin combination as employed in the driver-side portion 184 of the substrate 120. For example, in embodiments where the driver-side portion 184 of the substrate 120 defines the mounting bracket element 284 and is composed of a plurality of chopped carbon fibers within a nylon resin, the mounting bracket element 284 may also be substantially composed of chopped carbon fibers within a nylon resin. Likewise, in embodiments where the driver-side portion 184 of the substrate 120 comprises chopped carbon fiber in a nylon resin and defines the steering column bracket 280, the steering column bracket 280 may also be substantially composed of chopped carbon fibers within a nylon resin. Further, the mounting bracket element 284 and the steering column bracket 280 may also comprise any of the fibers and resins, disclosed in the foregoing, independent of the fibers and resins employed in the driver-side portion 184 of the substrate 120. Conventional mounting and support brackets are heavy metallic components which add weight to the instrument panel 26. By integrally forming the mounting bracket element 284 and the support bracket element 288 from a fiber and resin composite material, weight savings are achieved and the vehicle 14 can achieve a greater fuel economy.

In some embodiments, the fiber volume fraction of the mounting bracket element 284 and the steering column bracket 280 of the instrument panel 26 depicted in FIGS. 3-4 may be higher than the fiber volume fraction in the substrate 120 or the reinforcement 150. For example, the fiber volume fraction of the mounting bracket element 284 and the steering column bracket 280 can be between about 35% to about 65%, and more preferably between about 45% to about 55%. The substrate 120 may incorporate a fiber volume fraction in the mounting area 196 that is higher relative to the rest of the substrate 120 and which decreases with distance from the mounting area 196. Put another way, the substrate 120 may incorporate a fiber volume fraction gradient which decreases, in a continuous or stepwise manner, with increasing distance from the mounting area 196. Increased fiber volume fractions in the mounting area 196, the mounting bracket element 284, and the steering column bracket 280 can aid in supporting the weight of the steering column 68.

In additional embodiments, the fibers employed in the mounting bracket element 284 and the steering column bracket 280 of the instrument panel 26 depicted in FIGS. 3-4 can be of a shorter length than that of the substrate 120 and reinforcement 150. For example, the fibers can be between about 1 mm to 7 mm in average length, and more preferably between about 2 mm to 4 mm in average length. The fibers may be randomly oriented, but more preferably are substantially aligned with the directional stresses imposed by the steering column 68. Further, one or multiple fiber mat reinforcements may be employed in the mounting area 196, mounting bracket element 284, or the steering column bracket 280 where additional reinforcement is needed based on the expected applied mechanical stresses associated with the steering column 68 during operation of the vehicle 14. For example, a fiber mat may be incorporated into the steering column bracket 280 at the connection point for the mechanical fastener 296 in order to provide additional reinforcement.

According to further embodiments, the steering column bracket 280 of the instrument panel 26 may comprise multiple fiber material types, fiber volume fractions, and/or average fiber lengths. For example, the steering column bracket 280 may comprise chopped carbon fibers within a nylon resin at the engagement point with the steering column jacket 292 and chopped glass fibers within a nylon resin at the connection with the mounting area 196 of the substrate 120. In such a configuration, a boundary region 240 may be formed within the steering column bracket 280. In another example, the steering column bracket 280 may employ 2 mm average length fibers at an approximate 55% fiber volume fraction at the engagement point with the steering column jacket 292 and 4 mm average length fibers at an approximate 40% fiber volume fraction at the connection with the mounting area 196 of the substrate 120. By employing embodiments of instrument panel 26 with a controlled local composition of the steering column bracket 280, desired mechanical properties are achieved within the instrument panel 26 with efficient use of composite material constituents.

Figure 5:
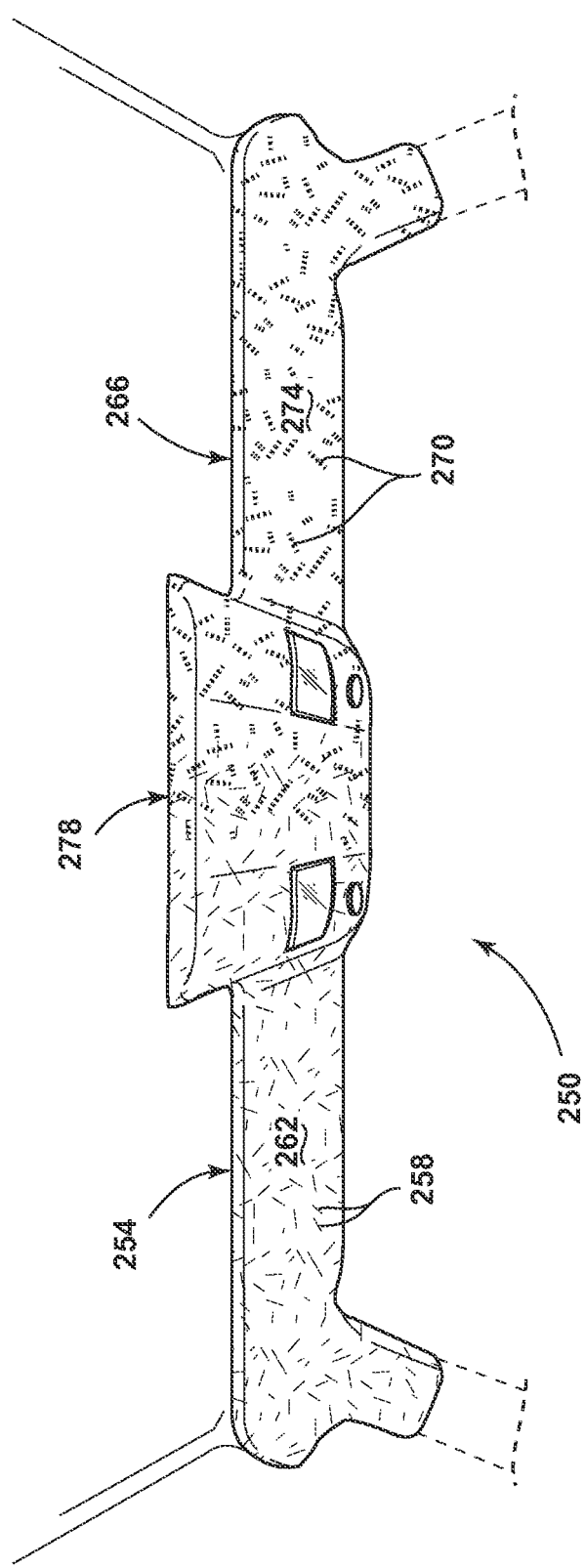
FIG. 5 is a bottom elevational view of a vehicular component according to another embodiment.

Referring now to FIG. 5, the foregoing aspects of the instrument panel substrate 120 and reinforcement 150 (see FIGS. 1 and 2 and the corresponding description) can extend to other components, such as a vehicular component 250. Here, component 250 has a first portion 254 comprising a first fiber material 258 within a first resin 262. The component 250 also has a second portion 266 including a second fiber material 270 within a second resin 274. Between the first and second portions 254, 266 of the component 250 is a component boundary region 278 having a mixture of the first and second fiber materials 258, 270 within the first and second resins 262, 274. The first and second portions 254, 266 can be in substantial proximity to respective passenger-side and driver-side regions 18, 22 (FIG. 1). As depicted schematically in FIG. 5, component 250 can be a headliner for the cabin 10 of the vehicle 14. But it should be understood that component 250 may be another component located inside or on the vehicle 14 (FIG. 1) suitable for fabrication from a hybrid composite according to the foregoing principles. The first and second fiber materials 258, 270 of the component 250 may be selected from the same group of fibers employed in the substrate 120. Further, the first and second fiber materials 258, 270 employed in the first and second portions 254, 266 may have the same or comparable fiber length and fiber volume fractions as the driver-side and passenger-side portions 184, 188 of the substrate 120. Similarly, the first and second resins 262, 274 of the component 250 can have a composition comparable to the resin or resins employed in the substrate 120. Further, the component 250 may incorporate a fiber mat comparable to the fiber mat described earlier in connection with the substrate 120.

Figure 6:
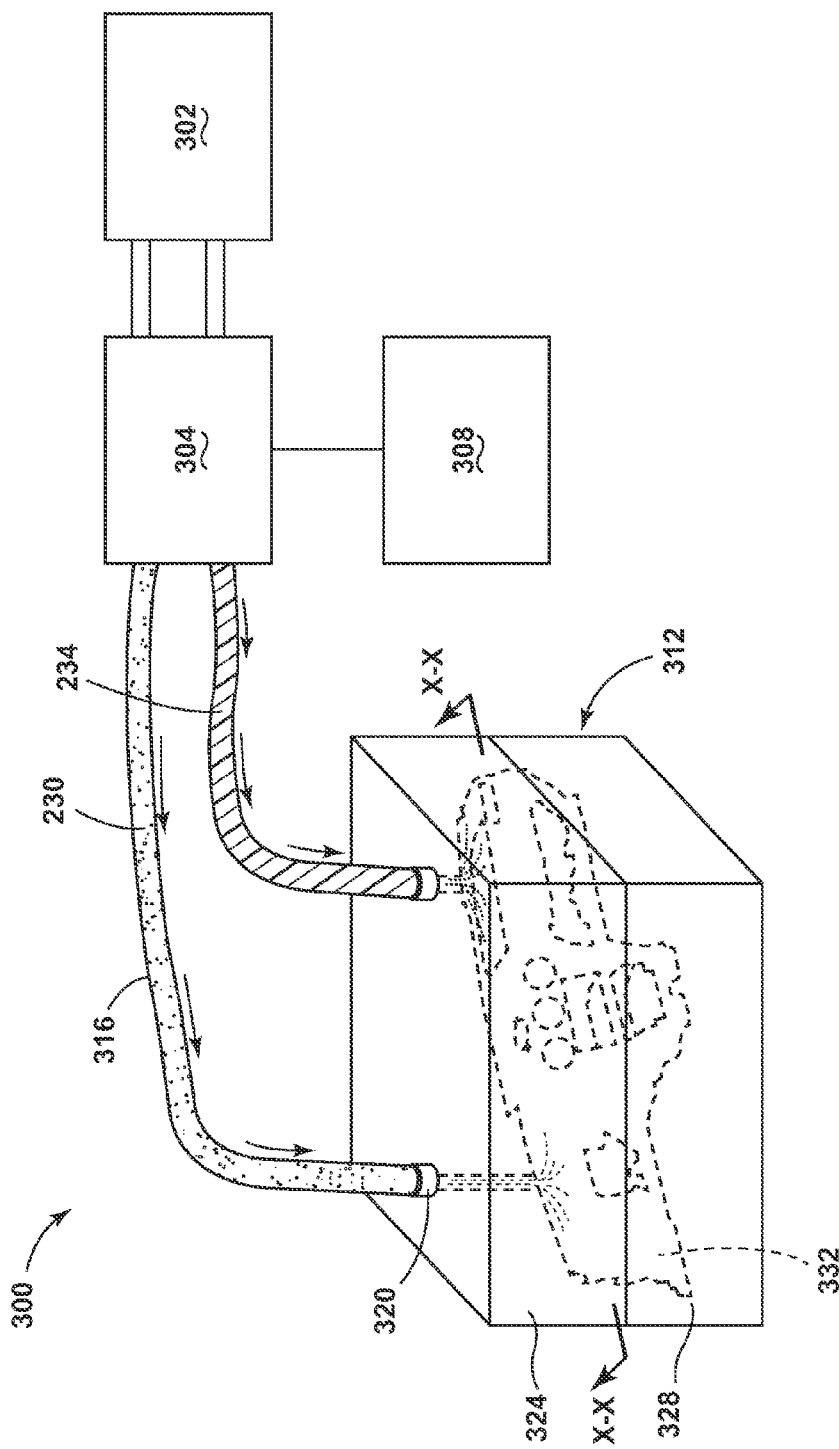
FIG. 6 is a top perspective view of an injection molding system according to an additional embodiment.

Referring now to FIG. 6, an injection molding system 300 is depicted that includes a heater 302, a pump 304, a controller 308, a mold 312, and a pair of injection lines 316 according to one embodiment. The heater 302 melts a first composite 230 and a second composite 234 and the pump 304 pressurizes and forces the melted first and second composites 230, 234 through the injection lines 316, and into the mold 312 via connection ports 320. The pump 304 is capable of producing high fluid pressures which permit the first and second composites 230, 234 to be injected into the mold 312 at high pressures and speeds. Each injection line 316 engages one of the connection ports 320 on the mold 312 such that the first and second composites 230, 234 can enter the mold 312 at different locations. In some embodiments of system 300, more than two composite materials can be injected into the mold 312. In these configurations, the injection molding system 300 can include separate injection lines 316 for each material and the mold 312 may contain separate connection ports 320 for each additional injection line 316.

When solidified, the first and second composite materials 230, 234 of FIG. 6 are suitable for formation of a final component, e.g., the instrument panel substrate 120, reinforcement 150, component 250. The first composite 230 includes the first fiber material 258 within the first resin 262. Similarly, the second composite 234 includes the second fiber material 270 within the second resin 274. Accordingly, the first and second fiber materials 258, 270 and the first and second resins 262, 274 may be composed of any of the respective fibers and resins disclosed in conjunction with the instrument panel substrate 120, the reinforcement 150, or the component 250.

Again referring to FIG. 6, the mold 312 has an A-plate 324 and a B-plate 328, each plate defining approximately half of a cavity 332 of the mold 312. The A-plate 324 includes the connection ports 320 through which the first and second composite materials 230, 234 enter the mold 312. The A- and B-plates 324, 328 each contain an impression of one half of the final vehicular component (e.g., vehicular component 250, substrate 120, reinforcement 150, etc.) such that when the mold 312 is closed, the negative impressions define the mold cavity 332 with the approximate dimensions of the final component. In some embodiments, the mold 312 may include inserts and/or subassemblies to aid in formation of the final component.

Figure 7A:
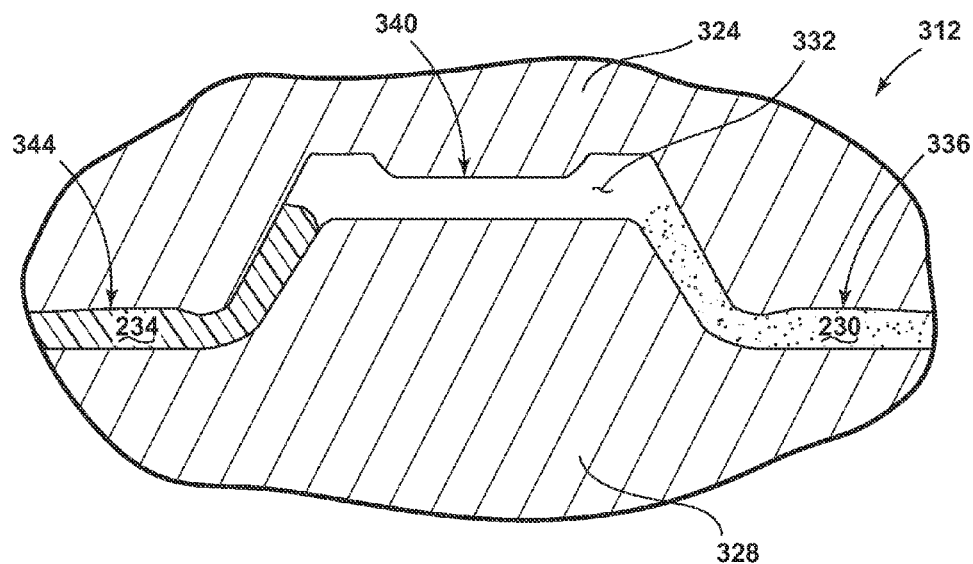
FIG. 7A is a cross-sectional view of the injection molding system of FIG. 6 during a step of injecting molten composites into a mold, taken at line X-X.

As shown in FIG. 7A, the mold 312, when configured to form a substrate 120, has a driver-side portion 336, a center-stack portion 340, and a passenger-side portion 344 oriented to form the respective portions 184, 180, 188 of the substrate 120 (FIG. 2). During injection of the melted first and second composites 230, 234, a pressure is exerted on the mold 312 such that the A-plate 324 and the B-plate 328 are forced together. The force acting on the mold 312 prevents mold separation and flashing from occurring on the substrate 120. The mold 312, while depicted in a closed state in FIG. 7A, may be opened by separating the A-plate 324 and the B-plate 328. While the mold 312 is in an open state, the substrate 120 may be ejected, and the mold 312 and cavity 332 can then be cleaned. The injection molding system 300 employing mold 312 may also be used in a like manner as described above to form the reinforcement 150, the plenum bracket 220, the vehicular component 250, or a variety of other vehicle components suitable for being fabricated with hybrid composites.

Figure 8:
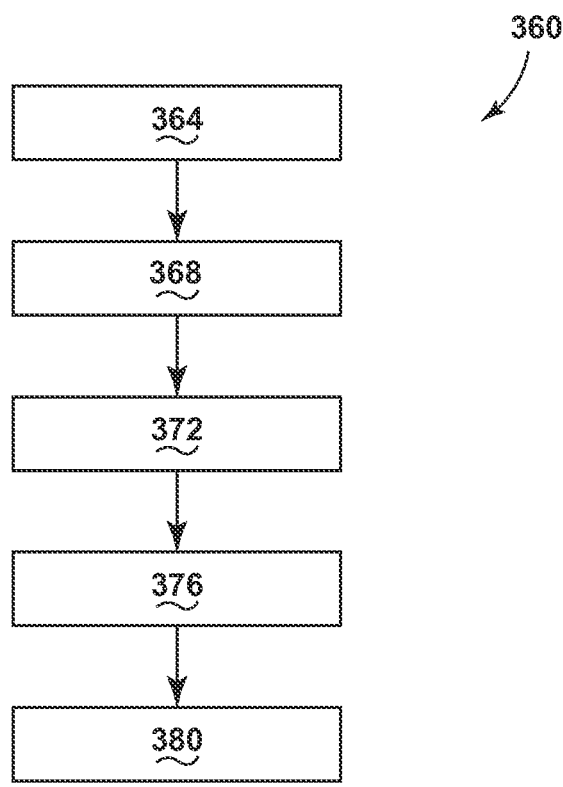
FIG. 8 is a schematic of a method for forming a vehicular component using the injection molding system of FIG. 6 according to another embodiment.

Referring now to FIG. 8, a schematic of a method 360 configured for formation of a final component, such as the substrate 120 of the instrument panel 26, is provided. The method 360 includes five primary steps, steps 364, 368, 372, 376, and 380. The method 360 begins with step 364 of melting the first and second composites 230, 234, followed by step 368 of preparing the injection molding system 300. Next, the step 372 of injecting the first and second melted composite materials 230, 234 into the cavity 332 of the mold 312 is performed. The step 376 of cooling the melted first and second composites 230, 234 to form the final component, e.g., substrate 120 of the instrument panel 26, is conducted next. Finally, the step 380 of removing the final component from the mold 312 is performed.

Referring to FIGS. 6-8, step 364 involves heating the first and second composites 230, 234 in the heater 302 to a temperature sufficient to melt the resin constituents. With the resins melted, the pump 304 is able to push the melted first and second composites 230, 234 through the injection lines 316 and into the cavity 332 of the mold 312 via the connection ports 320. The first and second composites 230, 234, particularly when comprising nylon resin, can be injected at a temperature between 100° C. and 400° C., and more preferably between 210° C. and 275° C. The melted first and second composites 230, 234 typically are superheated to a sufficiently high temperature to prevent their premature solidification in the injection lines 316 before reaching the cavity 332. As used herein, the term "superheat" refers to the temperature difference between the melting temperature and the injection temperature of the first and second composites 230, 234. The superheat is also necessary to ensure that the first and second composites 230, 234 have sufficiently low viscosity to enter narrow areas of the cavity 332. The superheat may be between 10° C. and 50° C. for composites 230, 234. Other injection temperatures and superheat conditions may be appropriate depending on the compositions selected for the composites 230, 234, geometry of the mold 312, and other conditions.

Step 368 of preparing the injection molding system 300 may include tasks such as preheating the mold 312, priming the injection lines 316, and/or placing a preassembled fiber mat or multiple mats into the cavity 332 of the mold 312. Step 372 of injecting the first and second composites 230, 234 may have a duration of between 5 seconds and 30 seconds, and more preferably between 10 seconds and 20 seconds. Other durations may be appropriate for more complex mold cavity 332 geometries and/or lower melt viscosity compositions for the composites 230, 234. In some embodiments, the injection of the melted first and second composites 230, 234 may be simultaneous, while in other embodiments, each composite is injected separately. During the injection step 372, the melted first and second composites 230, 234 are injected into respective driver-side and passenger-side portions 336, 344 of the mold 312 (see FIG. 7A), thereby causing substantial segregation of the fibers in the final component, e.g., substrate 120. The composites 230, 234 may also be injected at other points in the cavity 332 to create the desired segregation or other properties.

Referring again to FIGS. 6-8, step 376 of cooling the melted first and second composites 230, 234 to form the final component, e.g., substrate 120, occurs while the mold 312 is held under pressure and chilled. The mold 312 may be water chilled or may be air chilled to promote solidification of the final component. After solidification of the substrate 120, the mold is opened and step 380 of removing the final component is carried out by actuating a series of ejection pins (not shown) to eject the final component from the B-plate 328 of the mold 312.

With particular reference to FIG. 7A, a cross section of the mold 312 configured to produce the substrate 120 is depicted during the step 372 of injecting the first and second composite materials 230, 234 into the cavity 332 of the mold 312. The first and second composites 230, 234 are injected through a series of gates (not shown). The cavity 332 may be filled by injection of the first and second composites 230, 234 into respective driver-side and passenger-side portions 336, 344 of the cavity 332. Upon entering the mold 312, the melted first and second composites 230, 234 fluidly flow through the cavity 332 toward each other. The use of the series of gates allows composite materials of differing compositions and fiber volume fractions to be independently injected into the cavity 332 where desired.

Figure 7B:
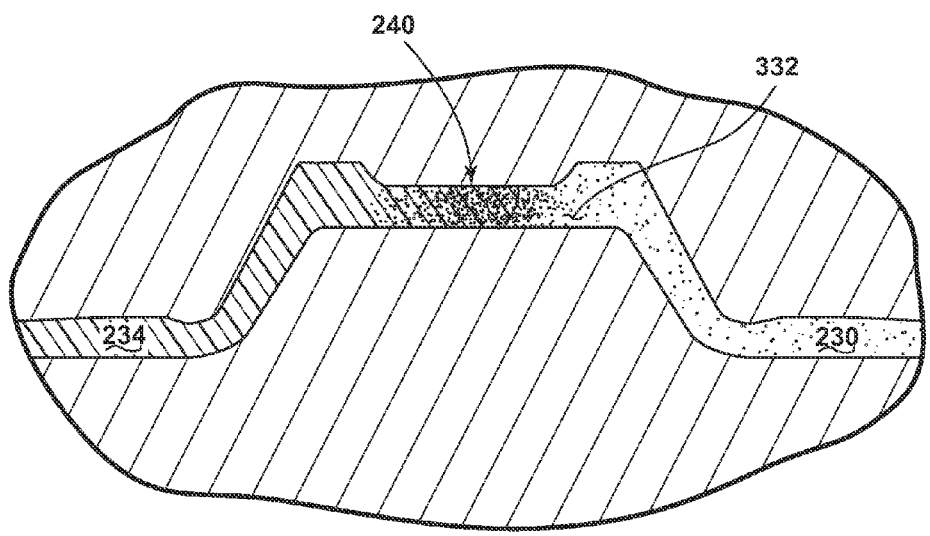
FIG. 7B is a cross-sectional view of the injection molding system of FIG. 6 during a step of cooling the melted composites, taken at line X-X.

Referring now to FIG. 7B, at a predetermined location in the cavity 332, the melted first and second composites 230, 234 continue to flow toward each other to combine to form the boundary region 240. The boundary region 240 includes a mixture of fibers and resins from the first and second composites 230, 234 and may have a width between 1 mm and 50 mm. The location and width of the boundary region 240 is controlled through design of the mold 312, processing parameters of the injection molding system 300 and the particular composition selected for the first and second composites 230, 234. The processing parameters may be controlled by the controller 308 (FIG. 6). In one exemplary embodiment, more than two composite materials having different compositions may be injected into the cavity 332 during the injection step 372. In this configuration, there can be a boundary region 240 between each of the composite materials such that each boundary region 240 has a different composition from the others. Upon cooling and solidification of the first and second composites 230, 234, the mixture of the resins and fibers within the boundary region 240 creates an integral connection between the first composite material 230 and the second composite material 234, thereby holding the substrate 120 or other final component together.

It is to be understood that variations and modifications can be made on the aforementioned structure without departing from the concepts of the present invention. For example, the present disclosure of integrated composite mounting features could be equally applied to the mounting brackets for a television body. Hybrid composite mounting brackets for a television, for example, may be incorporated into a hybrid composite television body such that exterior metal brackets are not required for mounting to a wall or a stand. Further, it is to be understood that such concepts are intended to be covered by the following claims unless these claims by their language expressly state otherwise.

What is claimed is:

1. A vehicular instrument panel, comprising:
    a substrate comprising a plurality of chopped carbon and glass fibers within a nylon resin; and
    a steering column bracket defined from the substrate comprising a plurality of chopped carbon fibers within a nylon resin and a boundary region having a mixture of chopped carbon and glass fibers within the nylon resin,
    wherein the bracket engages a steering column such that the substrate and bracket support the steering column.

2. The vehicular instrument panel of claim 1, wherein the steering column bracket further comprises a fiber mat reinforcement.

3. The vehicular instrument panel of claim 1, wherein the plurality of chopped carbon fibers in the substrate has a fiber volume fraction in the nylon resin of about 15% to about 40%.

4. The vehicular instrument panel of claim 3, wherein the plurality of chopped carbon fibers in the steering column bracket has a fiber volume fraction in the nylon resin of about 35% to about 65%.

5. The vehicular instrument panel of claim 1, wherein the plurality of chopped carbon fibers in the steering column bracket comprises chopped carbon fibers that are substantially aligned relative to each other.

6. The vehicular instrument panel of claim 1, wherein the plurality of chopped carbon and chopped glass fibers in the substrate are segregated such that the carbon fibers are substantially concentrated in a driver-side portion of the substrate and the chopped glass fibers are substantially concentrated in a passenger-side portion of the substrate.

7. The vehicular instrument panel of claim 1, wherein the chopped carbon fibers in the steering column bracket have an average fiber length of about 2 mm to about 4 mm.

8. A vehicular instrument panel, comprising:
    a substrate comprising a plurality of chopped carbon and chopped glass fibers within a nylon resin;
    a mounting bracket element defined from the substrate comprising a boundary region having a mixture of chopped carbon and glass fibers within a nylon resin; and
    a support bracket element coupled to the mounting bracket element,
    wherein the mounting bracket element further comprises a plurality of chopped carbon fibers within a-nylon resin.

9. The vehicular instrument panel of claim 8, wherein the mounting bracket element further comprises a fiber mat reinforcement.

10. The vehicular instrument panel of claim 8, wherein the plurality of chopped carbon fibers in the substrate has a fiber volume fraction in the nylon resin of about 15% to about 40%.

11. The vehicular instrument panel of claim 10, wherein the plurality of chopped carbon fibers in the mounting bracket has a fiber volume fraction in the nylon resin of about 35% to about 65%.

12. The vehicular instrument panel of claim 8, wherein the plurality of chopped carbon fibers in the mounting bracket element comprises chopped carbon fibers that are substantially aligned relative to each other.

13. The vehicular instrument panel of claim 8, wherein the chopped carbon fibers in the mounting bracket element have an average fiber length of about 2 mm to about 4 mm.

14. The vehicular instrument panel of claim 8, wherein the plurality of chopped carbon and chopped glass fibers in the substrate are segregated such that the carbon fibers are substantially concentrated in a driver-side portion of the substrate and the chopped glass fibers are substantially concentrated in a passenger-side portion of the substrate.

15. A vehicular instrument panel, comprising:
    a substrate comprising a first fiber material and a second fiber material within a first resin, the first and second fiber materials substantially segregated into respective driver-side and passenger-side portions of the substrate; and
    a mounting bracket defined from the driver-side portion of the substrate,
    wherein the mounting bracket comprises the first fiber material within the first resin, and
    further wherein a center-stack portion of the substrate comprises a boundary region having a mixture of the first and second fiber materials within the first resin.

16. The vehicular instrument panel of claim 15, wherein the first and second fiber materials are each selected from the group of materials consisting of carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses.

17. The vehicular instrument panel of claim 15, wherein the first resin is selected from the group of materials consisting of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

18. The vehicular instrument panel of claim 15, wherein the first fiber material in the mounting bracket comprises fibers that are substantially aligned relative to each other.

19. The vehicular instrument panel of claim 15, wherein the first fiber material of the mounting bracket has an average fiber length of about 2 mm to about 4 mm.

20. The vehicular instrument panel of claim 15, wherein the mounting bracket further comprises a fiber mat reinforcement.

* * * * *